US011952128B2

(12) United States Patent
Ponjican et al.

(10) Patent No.: US 11,952,128 B2
(45) Date of Patent: Apr. 9, 2024

(54) AIRCRAFT SEAT ARM O-RING FRICTION MECHANISM

(71) Applicant: B/E Aerospace, Inc., Winston-Salem, NC (US)

(72) Inventors: Samuel Ponjican, Winston-Salem, NC (US); Ryan J. Suhre, Winston-Salem, NC (US); Stephen A. Puglisi, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 41 days.

(21) Appl. No.: 17/713,726

(22) Filed: Apr. 5, 2022

(65) Prior Publication Data

US 2023/0312106 A1  Oct. 5, 2023

(51) Int. Cl.
*B64D 11/06* (2006.01)
*B60N 2/90* (2018.01)

(52) U.S. Cl.
CPC .......... *B64D 11/0644* (2014.12); *B60N 2/938* (2018.02); *B60N 2205/20* (2013.01)

(58) Field of Classification Search
None
See application file for complete search history.

(56) References Cited

U.S. PATENT DOCUMENTS

| | | | |
|---|---|---|---|
| 5,823,624 A * | 10/1998 | Dahlbacka | B60N 2/77 297/411.32 |
| 6,125,509 A | 10/2000 | Hartigan et al. | |
| 6,634,061 B1 | 10/2003 | Maynard | |
| 6,767,065 B2 * | 7/2004 | Heranney | B60R 13/0243 297/411.38 |
| 7,047,599 B2 | 5/2006 | Oshima et al. | |
| 7,896,568 B2 | 3/2011 | Atkinson | |
| 9,758,074 B1 * | 9/2017 | Lin | B60N 2/933 |
| 9,937,841 B2 | 4/2018 | Garing et al. | |
| 10,993,535 B2 | 5/2021 | Nill et al. | |
| 11,510,496 B1 * | 11/2022 | Zhang | A47C 7/541 |
| 2005/0029854 A1 * | 2/2005 | Hann | B60N 2/753 297/411.2 |

(Continued)

FOREIGN PATENT DOCUMENTS

DE  202006008610 U1 *  9/2006 ............... B60N 2/20
DE  102020120824 A1  4/2021

OTHER PUBLICATIONS

Extended European Search Report dated Aug. 22, 2023; European Application No. 23162154.1.

*Primary Examiner* — David E Allred
(74) *Attorney, Agent, or Firm* — Suiter Swantz pc llo

(57) ABSTRACT

An arm rest assembly and aircraft passenger seat including the same. The arm rest includes a friction mechanism for resisting abrupt rotational movements of the arm rest. A rotationally fixed frame member defining a rotational axis and receives a rotational member of the arm rest configured to rotate around the rotational axis. A groove formed in an outer circumferential surface of the rotational member seats a O-ring disposed between the groove and an inner circumferential surface of the frame member. Tolerance between the frame member and arm rest is such that the O-ring is held in the groove in a compressed state and frictionally engagement each of the rotational member and the frame member.

12 Claims, 6 Drawing Sheets

(56) References Cited

U.S. PATENT DOCUMENTS

| | | |
|---|---|---|
| 2006/0032022 A1 | 2/2006 | Minami |
| 2011/0167940 A1 | 7/2011 | Shavrnoch et al. |
| 2012/0091764 A1* | 4/2012 | Cailleteau .......... B64D 11/0644 |
| | | 297/445.1 |
| 2013/0305503 A1 | 11/2013 | Weber et al. |
| 2019/0084458 A1* | 3/2019 | Nonaka ................. B60N 2/753 |
| 2019/0283883 A1* | 9/2019 | Murnan ................ B60N 2/767 |
| 2020/0307805 A1* | 10/2020 | Wenger ............. B64D 11/0644 |
| 2021/0155132 A1* | 5/2021 | Morishita ............. B60N 2/757 |

* cited by examiner

600 — FORM AN O-RING GASKET, WHEREIN THE O-RING GASKET IS FORMED SO THAT AND THE O-RING GASKET FITS SNUGLY IN A CIRCULAR GROOVE OF A ROTATIONAL MEMBER OF AN ARMREST, AND PROVIDES FRICTION BY RUBBING BOTH THE ROTATIONAL MEMBER AND AN INNER SURFACE OF THE ARMREST

FIG.6

AIRCRAFT SEAT ARM O-RING FRICTION MECHANISM

BACKGROUND

Various types of seats are equipped with arm rests. In passenger aircraft, to which the present invention finds application, arm rests associated with economy class passenger seats are typically configured to pivot between stowed and deployed conditions. When stowed, the arm rest is oriented near vertical to be positioned out of the way of entering and exiting passengers. When deployed, the arm rest is oriented near horizontal for use during flight. Arm rests are subjected to repeated cycling between the stowed and deployed conditions which causes wear and tear on the arm rest, particularly with respect to internal rotational components of the arm rest. Over time, tolerances decreases as components wear and loosen, which diminishes the ability of the arm rest to maintain position.

BRIEF SUMMARY

The present disclosure is generally directed to arm rest assemblies and seats including arm rest assemblies, for instance aircraft passenger seats equipped with rotating arm rests.

According to one aspect, the present disclosure provides embodiments of an arm rest assembly including a rotationally fixed frame member defining a rotational axis, an arm rest including a rotational member rotatably coupled to the frame member, the rotational member configured to rotate around the rotational axis, a groove formed in an outer circumferential surface of the rotational member, and an O-ring disposed in the groove. The O-ring is disposed between the outer circumferential surface of the rotational member and an inner circumferential surface of the frame member. A tolerance between the outer circumferential surface of the rotational member and the inner circumferential surface of the frame member is such that the O-ring is held in the groove in a compressed state and in frictional engagement with each of the rotational member and the frame member. The arm rest is configured to rotate, for example, between a stowed condition and a deployed condition.

In some embodiments, the groove has a curved sectional profile and the O-ring has a circular sectional profile, and a height of the O-ring is greater than a height of the groove.

In some embodiments, the groove has a rectangular sectional profile and the O-ring has a circular sectional profile, and a height of the O-ring is greater than a height of the groove.

In some embodiments, the groove has a rectangular sectional profile and the O-ring has a rectangular sectional profile, and a height of the O-ring is greater than a height of the groove.

In some embodiments, the frame member comprises a second groove formed in an inner circumferential surface of the frame member, wherein the first groove and the second groove are aligned, and wherein the O-ring is disposed in the first and second grooves.

In some embodiments, the rotational member includes a shoulder formed on an outer circumferential surface of the rotational member, wherein the frame member is captured between the shoulder and a separate arm rest member.

In some embodiments, the arm rest further includes a first rotational stop and the frame member comprises a second rotational stop, wherein the first rotational stop engages the second rotational stop to limit rotation of the arm rest in a direction of the deployed condition of the arm rest.

In some embodiments, the rotational member is cylindrical and the frame member defines a cylindrical opening receiving the rotational member.

In some embodiments, the O-ring is elastomeric.

According to another aspect, the present disclosure provides embodiments of an aircraft passenger seat equipped with at least one arm rest. A rotationally fixed frame member defines a rotational axis. An arm rest assembly is rotatably coupled to the frame member and includes a rotational member rotatably coupled to the frame member, the rotational member configured to rotate around the rotational axis, a groove formed in an outer circumferential surface of the rotational member, and an O-ring disposed in the groove. The O-ring is disposed between the outer circumferential surface of the rotational member and an inner circumferential surface of the frame member. A tolerance between the outer circumferential surface of the rotational member and the inner circumferential surface of the frame member is such that the O-ring is held in the groove in a compressed state and in frictional engagement with each of the rotational member and the frame member. The arm rest is configured to rotate relative to the frame member between a stowed condition and a deployed condition.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 6 is a flowchart illustrating a method of manufacturing an O-ring gasket, in accordance with one or more embodiments of the present disclosure.

DETAILED DESCRIPTION

Figure 1:
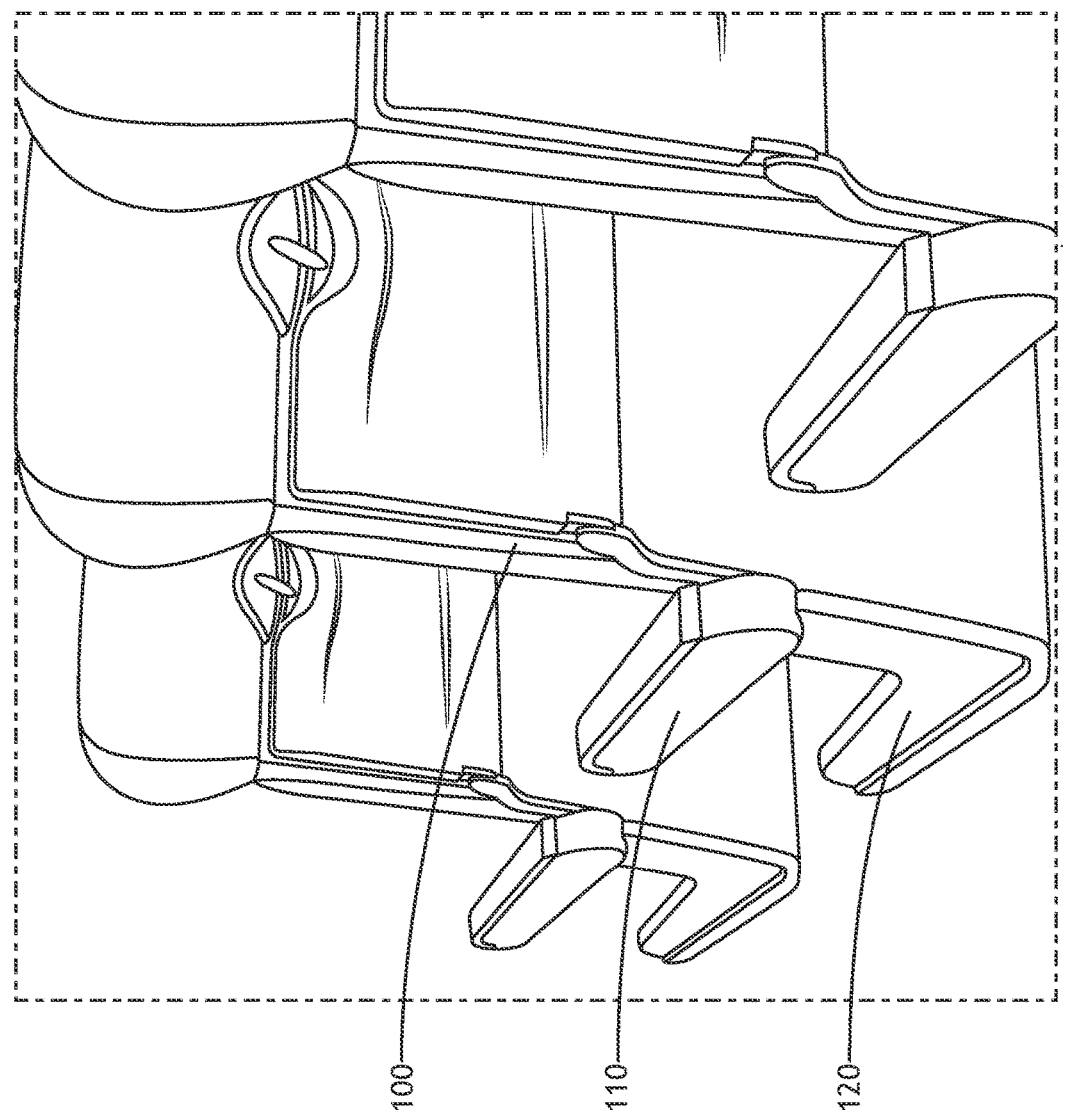
FIG. 1 is a perspective view illustrating aircraft seats of adjacent rows.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

A typical aircraft seat arm rest is stowed by raising the arm rest, for example, by rotation. When the arm rest is deployed for use, it may be desirable that the arm rest does not free fall into position, which may cause the arm rest to rattle and/or potentially harm a passenger. The arm rest can be slowed during a fall using a friction mechanism in the arm rest pivot. Typical friction mechanisms that provide consistent friction throughout the life of the product are often expensive. Therefore, a low-cost option is desirable.

Embodiments of the present disclosure are directed to O-ring gaskets and methods of manufacturing the same. The O-ring gaskets are implemented in an arm rest pivot mechanism such that inner and outer circumferential surfaces of the O-ring gasket are subject to compression between rotational components, thereby providing continuous friction throughout a requisite number of rotation cycles without losing friction.

A benefit of the present disclosure relates to the low cost of the O-ring gasket and ease of serviceability and replaceability as necessary. Additionally, the compression of the inner and outer surfaces enables simplified dimensional control of the inner and outer surface area dimensions to control compression, in contrast to an axial compression, for example, controlled by tightening a pivot fastener.

FIG. 1 is a conceptual image illustrating seat rows including aircraft seats. Each aircraft seat 100 may be included in an economy seating class, a business seating class, a first seating class, etc. The aircraft seat 100 may be part of a row of aircraft seats, and may be positioned adjacent to an aircraft aisle, an aircraft window, or another aircraft seat 100. The aircraft seat 100 typically includes a seat frame 120, for instance a base structure. The aircraft seat 100 may include a tray table for serving a passenger in another seat directly behind the seat 100 and a pocket for holding items, among other seat amenities inconsequential to the present disclosure.

The aircraft seat 100 includes at least one arm rest 110. In the case of an aisle seat, the aircraft seat 100 may include a first arm rest positioned adjacent the aisle and a second arm rest positioned apart from the aisle, for instance shared with a laterally adjacent seat. The arm rest 110 stows and deploys according to the flight condition of the aircraft. In the deployed condition, the arm rest 110 may be oriented substantially horizontal to support the arm of a user of the seat 100. In the stowed condition, the arm rest 110 may be oriented substantially vertical, for instance positioned alongside the seatback. When transitioning the arm rest 110 from the stowed condition to the deployed condition, for example by rotating the arm rest approximately 90 degrees, the arm rest may 'fall' undesirably quickly, and therefore, a friction mechanism is provided configured to slow the 'fall' of the arm rest. The friction mechanism further functions to help maintain the position of the arm rest 110, for instance maintaining the arm rest in the fully stowed condition. In addition, the friction mechanism constrains and softens the rotational motion of the arm rest 110.

Figure 2:
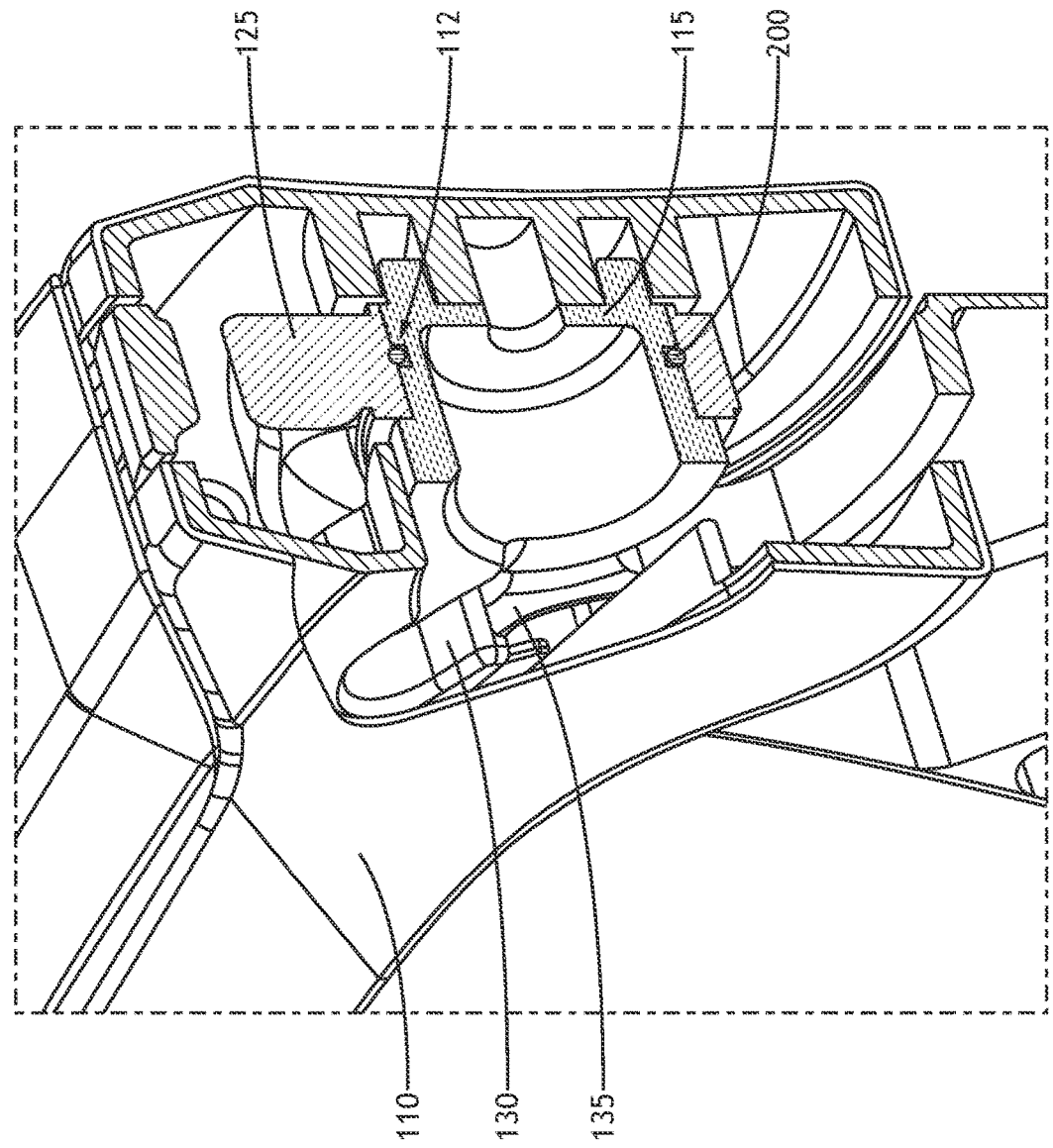
FIG. 2 is a perspective cross-sectional view illustrating an O-ring gasket disposed in an arm rest of an aircraft seat, for instance one of the aircraft seats shown in FIG. 1, in accordance with one or more embodiments of the present disclosure.

FIG. 2 is a cross-sectional view illustrating an arm rest assembly including a friction mechanism according to a first embodiment of the present disclosure. The friction mechanism generally includes an O-ring gasket 200 disposed within the interior of the arm rest 110. In some embodiments, the O-ring is elastomeric. The arm rest 110 is rotatably coupled to a seat frame member 125, for instance coupled to the upper end of a fixed seat spreader. The arm rest 110 may be secured to the seat frame member via a fastener 105 (see FIG. 3) or otherwise attached. In some embodiments, the fastener 105 and the corresponding structure include a threadably engaging bolt and receptacle. The fastener 105 attaches, couples or secures the arm rest 110 to the seat frame, and in some embodiments, defines the axis of rotation of the arm rest.

The arm rest 110 includes a rotational member 115 configured to rotate the arm rest 110 around the rotational axis. In some embodiments, the rotational member 115 and the fastener 105 are substantially cylindrical and concentric, thus sharing a common center with the rotational axis. The rotational member 115 defines an outer circumferential groove 112 configured to receive and seat an O-ring gasket 200. The O-ring gasket 200 seated in the groove 112 provides friction to slow the rotational motion of the arm rest 110 through contact with the rotational member 115 and an inner circumferential surface of the seat frame member 125. The O-ring gasket 200 is sized, for instance oversized as compared to the dimensions of the groove 112, such that the O-ring gasket 200 when installed frictionally engages both the rotational member 115 and the inner surface of the frame member 125 simultaneously. In some embodiments, the O-ring gasket 200 fills or is oversized as compared to the formed groove 112 such that the O-ring, when installed in the groove, is compressed between the rotational member and frame member 125. Contact with each of the respective components is maintained even as the O-ring gasket 200 wears over time due to the expansive memory of the O-ring material. In some embodiments, a lateral surface of an internal arm rest member bears against a facing surface of the frame member 125 such that the arm rest rotates in a vertical plane. In some embodiments, a stop 130 formed on the arm rest 110 engages a stop 135 formed on the frame member 125 to limit rotation of the armrest beyond the fully deployed position, and in some embodiments, stops also prevent rotation beyond the fully stowed position.

Figure 3:
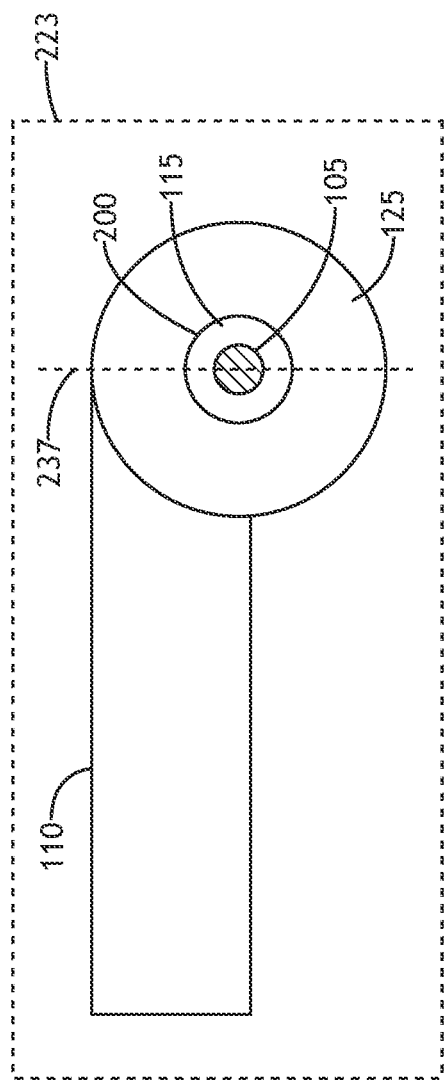
FIG. 3 is a frontal cross-sectional view illustrating the O-ring gasket disposed in the arm rest of the aircraft seat, in accordance with one or more embodiments of the present disclosure.

FIG. 3 is a frontal cross-sectional view illustrating the concentric arrangement of the fastener 105, the rotational member 115 of the arm rest 110, the frame member 125, and the O-ring gasket 200. Further illustrated is a frontal cross-section plane 223 and a transverse cross-section plane 227 discussed further below with respect to FIGS. 4-5. With reference to FIGS. 2-3, in some embodiments the fastener 105 is received through an opening formed through the rotational member 115 and engages in a corresponding opening formed in another arm rest member, and wherein the frame member 125 is captured between the rotational member 115 and the other arm rest member, for instance bearing against a shoulder formed on the rotational member 115.

Figure 4:
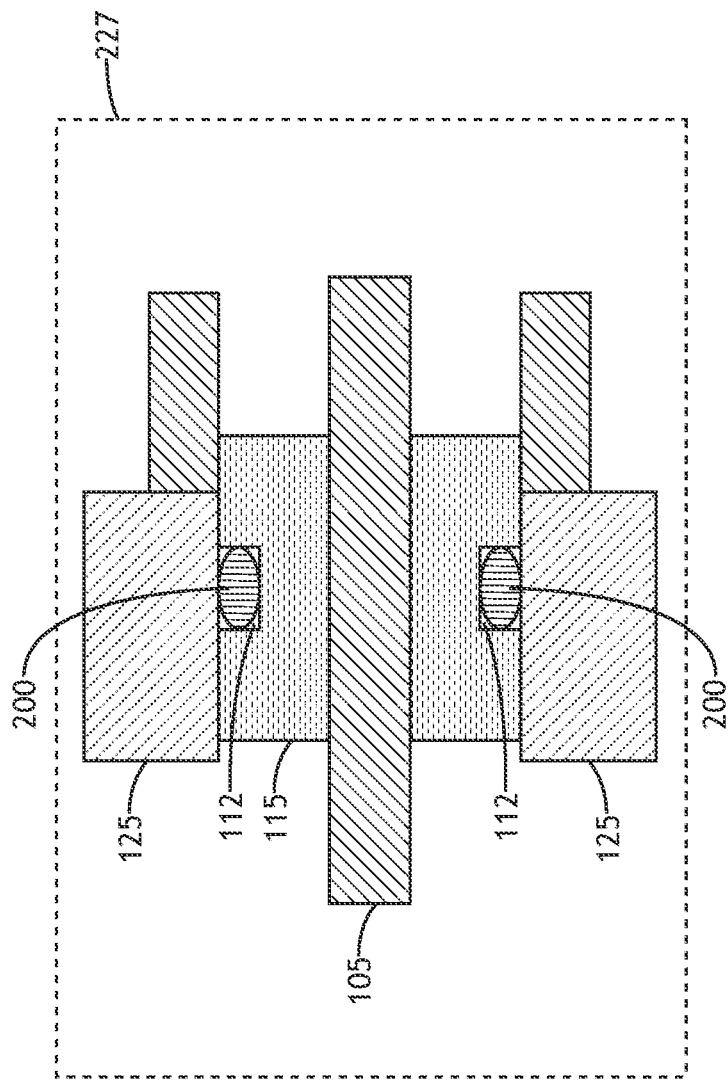
FIGS. 4-5 are transverse cross-sectional views illustrating the O-ring gasket disposed in the arm rest of the aircraft seat, in accordance with one or more embodiments of the present disclosure.
Figure 5:
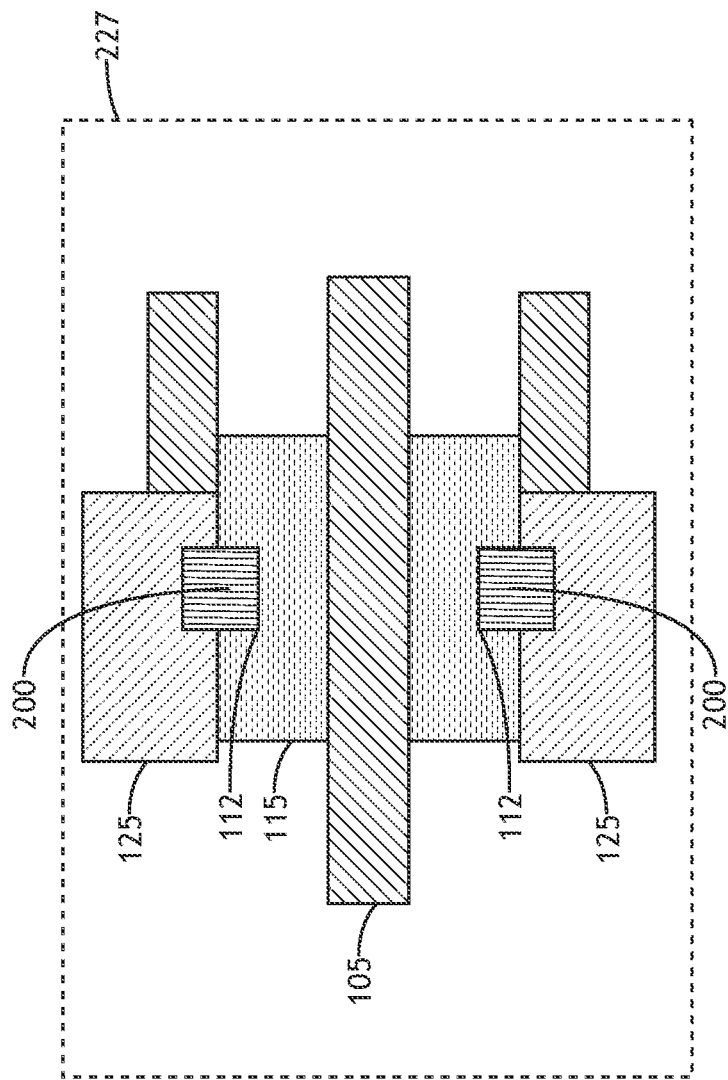

FIGS. 4-5 are transverse cross-sectional views illustrating the O-ring gasket 200 disposition within the arm rest 110. As shown in FIG. 4, the transverse plane 227 cross-section of the O-ring gasket 200 may have a circular cross-sectional profile. However, in other embodiments, as shown in FIG. 5, the transverse plane 227 cross-section of the O-ring gasket 200 may have a square profile, which may be advantageous due to the increased contact area between the surface area of the O-ring gasket 200 and each of the surface areas of the rotational member 115 and the frame member 125. In some embodiments, the groove profile may correspond in shape to the O-ring profile as shown in FIG. 5, or the two profiles may differ as shown in FIG. 4, depending on the desired interfaces. In addition, in some embodiments, the frame member 125 may or may not include a corresponding inner circumferential groove for seating the O-ring. FIG>4 shows the frame member 125 without a groove, whereas FIG. 5 shows the frame member 125 with a groove.

FIG. 6 is a flowchart illustrating a method of manufacturing the O-ring gasket. At 600, an O-ring gasket may be formed and then positioned within the arm rest such that the O-ring gasket substantially fills and extends from the circumferential groove formed in the rotational member of the arm rest. The arm rest is then coupled to the seat frame member such that the seat frame member applies a compressive force to the O-ring to ensure frictional engagement with each of the rotational member and the inner surface of the arm rest frame member. Depending on the O-ring construction and material, wear of time lessens the compressive force. Monitoring of the motion of the arm rest can be used to determine the need for replacement of the O-ring gasket.

It is noted herein that the term "length" may be construed as the largest dimension of a given 3-dimensional structure or feature. The term "width" may be construed as the second largest dimension of a given 3-dimensional structure or feature. The term "thickness" may be construed as a smallest dimension of a given 3-dimensional structure or feature. A "major surface" may be construed as a surface defined by the two largest dimensions of a given structure or feature, which in the case of a structure or feature having a circular surface, may be defined by the radius of the circle.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An arm rest assembly, comprising:
   a rotationally fixed frame member defining a rotational axis for an arm rest;
   an arm rest member including a rotational member rotatably disposed through the frame member, the rotational member configured to rotate around the rotational axis, and the rotational member having a rigid outer circumferential surface comprising an annular shoulder bearing against one side of the frame member;
   a separate arm rest member removably attached to the rotational member, the separate arm rest member receiving one end of the rotational member, and the separate arm rest member bearing against an opposing side of the frame member such that the frame member is captured between the annular shoulder and the separate arm rest member;
   a groove formed in the outer circumferential surface of the rotational member; and
   an O-ring disposed in the groove;
   wherein the O-ring is disposed between the outer circumferential surface of the rotational member and an inner circumferential surface of the frame member;
   wherein a tolerance between the outer circumferential surface of the rotational member and the inner circumferential surface of the frame member is such that the O-ring is held in the groove in a compressed state and in frictional engagement with each of the rotational member and the frame member; and
   wherein the arm rest comprising the arm rest member and the separate arm rest member each configured to rotate between a stowed condition and a deployed condition for receiving and supporting an arm of a user.

2. The arm rest assembly according to claim 1, wherein the groove has a rectangular sectional profile and the O-ring has a circular sectional profile, and wherein a height of the O-ring is greater than a height of the groove.

3. The arm rest assembly according to claim 1, wherein the groove has a rectangular sectional profile and the O-ring has a rectangular sectional profile, and wherein a height of the O-ring is greater than a height of the groove.

4. The arm rest assembly according to claim 1, further comprising a second groove formed in an inner circumferential surface of the frame member, wherein the first groove and the second groove are aligned, and wherein the O-ring is disposed in the first and second grooves.

5. The arm rest assembly according to claim 1, wherein the rotational member comprises a first rotational stop and the frame member comprises a second rotational stop, wherein the first rotational stop engages the second rotational stop to limit rotation of the arm rest in a direction of the deployed condition of the arm rest.

6. The arm rest assembly according to claim 1, wherein the rotational member is cylindrical and the frame member defines a cylindrical opening receiving the rotational member.

7. The arm rest assembly according to claim 1, wherein the O-ring is elastomeric.

8. An aircraft passenger seat, comprising:
a rotationally fixed frame member having a cylindrical opening defining a rotational axis; and
an arm rest rotatably coupled to the frame member, the arm rest comprising:
an arm rest member including a rotational member having a rigid outer circumferential surface and being rotatably disposed through the cylindrical opening of the frame member, the rotational member configured to rotate around the rotational axis;
an annular shoulder formed on the outer circumferential surface and bearing against one side of the frame member;
a separate arm rest member removably attached to the rotational member, the separate arm rest member receiving one end of the rotational member, and the separate arm rest member bearing against an opposing side of the frame member such that the frame member is captured between the annular shoulder and the separate arm rest member;
a groove formed in an outer circumferential surface of the rotational member; and
an O-ring disposed in the groove;
wherein the O-ring is disposed between the outer circumferential surface of the rotational member and an inner circumferential surface of the frame member;
wherein a tolerance between the outer circumferential surface of the rotational member and the inner circumferential surface of the frame member is such that the O-ring is held in the groove in a compressed state and in frictional engagement with each of the rotational member and the frame member; and
wherein the arm rest comprising the arm rest member and the separate arm rest member each configured to rotate relative to the frame member between a stowed condition and a deployed condition for receiving and supporting an arm of a user.

9. The aircraft passenger seat according to claim 8, wherein the groove has a rectangular sectional profile, and wherein the O-ring has a circular sectional profile or a rectangular sectional profile, and wherein a height of the O-ring is greater than a height of the groove.

10. The aircraft passenger seat according to claim 8, further comprising a second groove formed in an inner circumferential surface of the frame member, wherein the first groove and the second groove are aligned, and wherein the O-ring is disposed in the first and second grooves.

11. The aircraft passenger seat according to claim 8, wherein the rotational member comprises a first rotational stop and the frame member comprises a second rotational stop, wherein the first rotational stop engages the second rotational stop to limit rotation of the arm rest in a direction of the deployed condition of the arm rest.

12. The aircraft passenger seat according to claim 8, wherein the rotational member is cylindrical.

* * * * *